Aug. 29, 1967 C. W. SNEDEKER 3,338,159
CHECK PROTECTOR APPARATUS
Filed Dec. 9, 1964 3 Sheets-Sheet 1

INVENTOR.
Charles W. Snedeker
By Merriam, Smith & Marshall
ATTORNEYS.

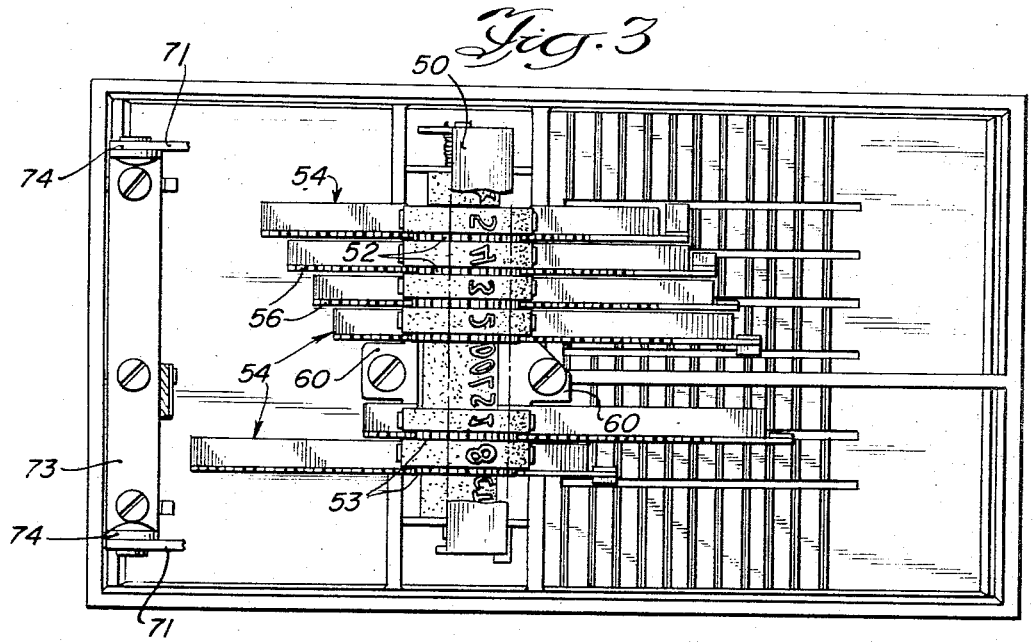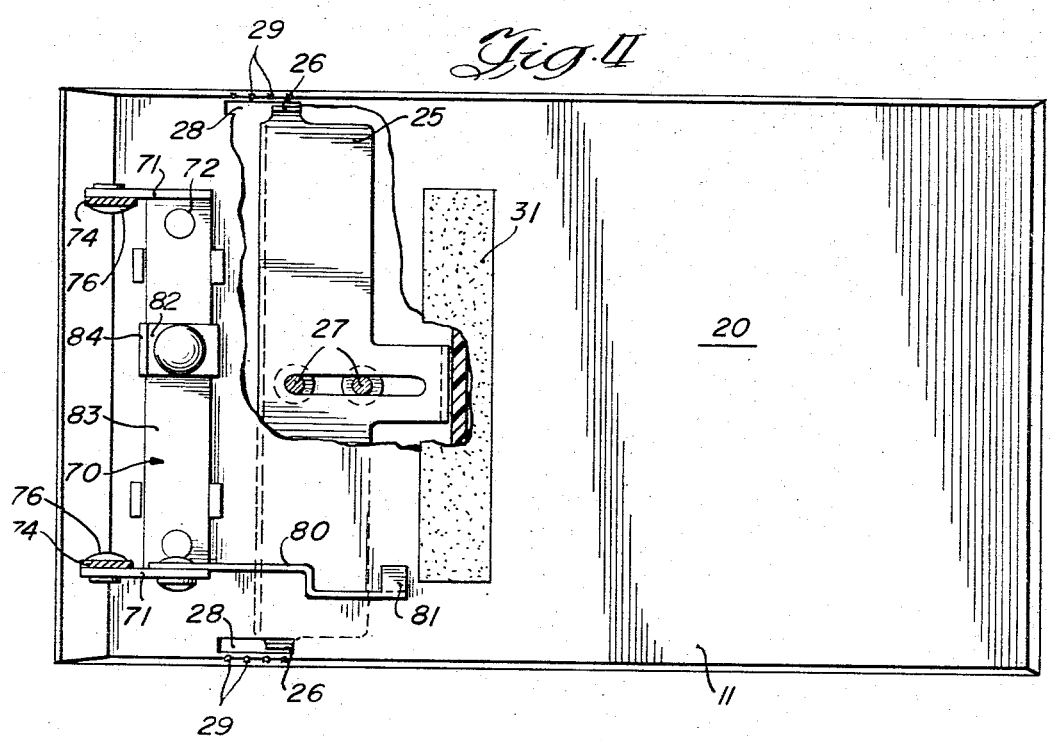

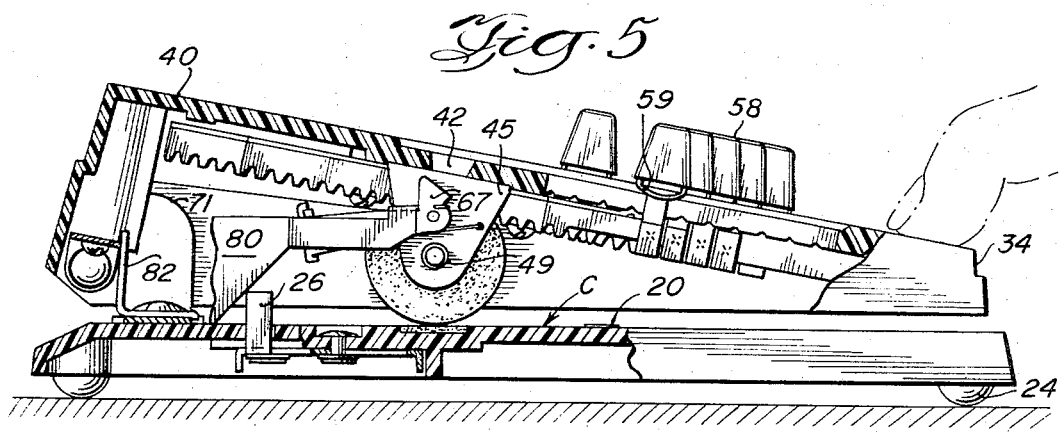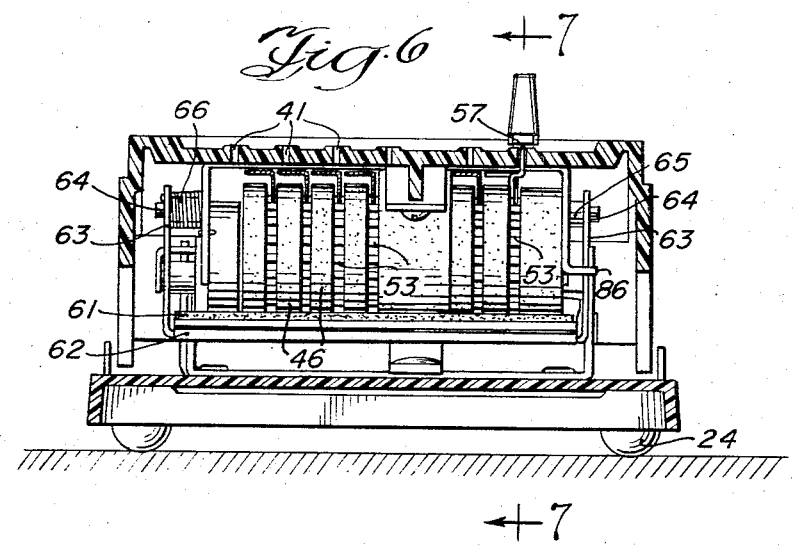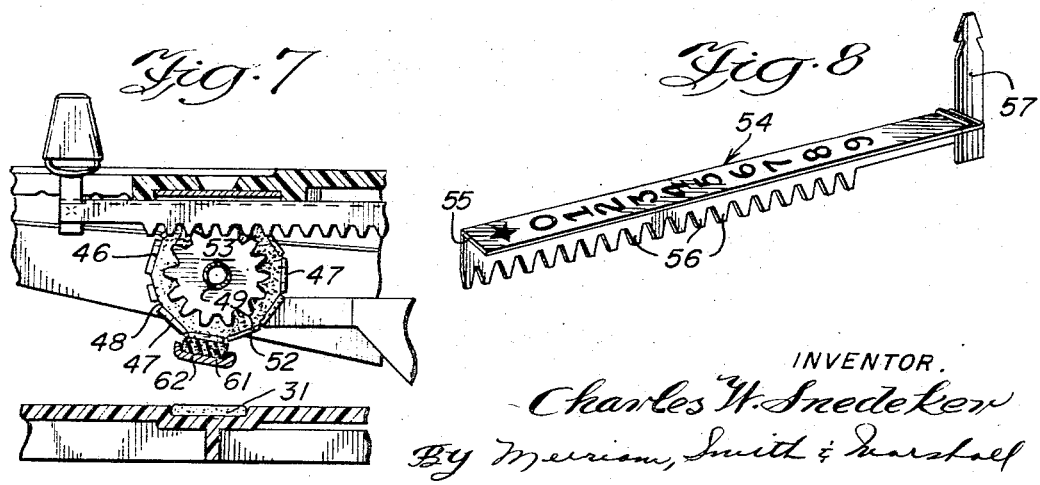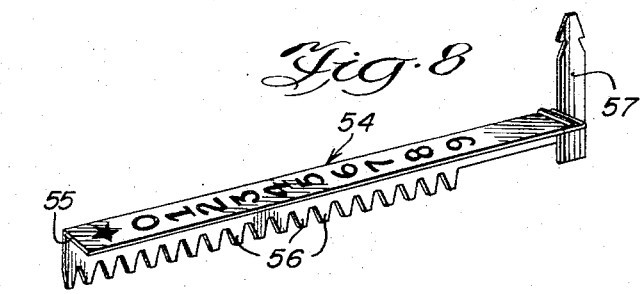

United States Patent Office 3,338,159
Patented Aug. 29, 1967

3,338,159
CHECK PROTECTOR APPARATUS
Charles W. Snedeker, Chicago, Ill., assignor to
Ellen J. Marchen, Chicago, Ill.
Filed Dec. 9, 1964, Ser. No. 417,092
11 Claims. (Cl. 101—95)

This invention relates generally to a check protector apparatus and more particularly relates to an improved check protector device which is adaptable for home use.

Many check protector devices currently available are large, bulky units which are utilized in banks, financial institutions, corporations, and the like, for embossing or imprinting monetary values and other pertinent data on commercial paper. In many instances, cost alone prohibits their use in an individual's home or in relatively small firms. Moreover, the size and weight of these units serve to prevent home owners who have to prepare a large number of checks on a daily, weekly or monthly basis from using the large, expensive, conventional check protector units in their homes.

Although a check protector device for home use, United States Letters Patent 3,105,436 to Kenneth S. Rounds, et al., has been disclosed, this device is far from satisfactory for most users. Because of the intricate and complicated design of the unit shown in the patent, the cost for manufacturing the Rounds, et al. apparatus would be too high to be accepted as an economical purchase by the average purchaser. In addition, a certain amount of proficiency is required to operate the device.

To obviate the undesirable features inherent in both present-day, commercial and home check protector devices, I have invented a new and novel check protector apparatus which is inexpensive in comparison to the costs of conventional units, compact, lightweight, readily adaptable for home use, and easy to operate by even the most inexperienced operator.

In my apparatus, a check or other commercial paper is placed on a base member, with an edge of the check abutting a check positioning means. The portion of the check which is to be printed preferably rests upon a resilient pad. Selected positioning of individual rack and pinion assemblies orient corresponding wheels having embossing and/or printing characters relative to the check. Pressure exerted by the fingers of an operator against the cover pivots the cover assembly and the wheels having inked numerals thereon downward to contact the check whereby data is imprinted on the positioned check.

Other features and advantages are inherent in the structure claimed and disclosed, or will become apparent to those skilled in the art from the following detail description in conjunction with the accompanying diagrammatic drawings, wherein:

FIGURE 3 shows a bottom view of the cover assembly showing the various rack and pinion means;

FIGURE 4 shows a plan view of the base assembly with a portion of the assembly removed to expose the positioning mechanism employed in my apparatus;

FIGURE 5 shows a cut-away elevation view of my check protector apparatus with the cover assembly in a printing position;

FIGURE 6 shows a view of the rack and pinion arrangement employed in my apparatus along line 6—6 in FIGURE 2;

FIGURE 7 shows a view along line 7—7 in FIGURE 6; and

FIGURE 8 shows a perspective view of the rack assembly embodiment utilized in my check protector apparatus.

Figure 1:
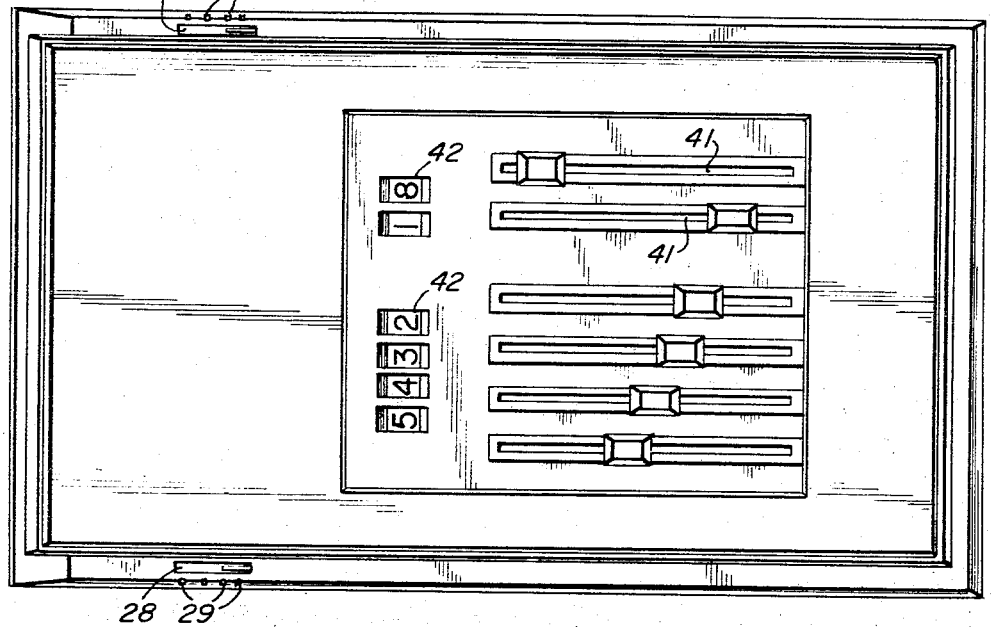
FIGURE 1 shows a plan view of my check protector apparatus.
Figure 2:
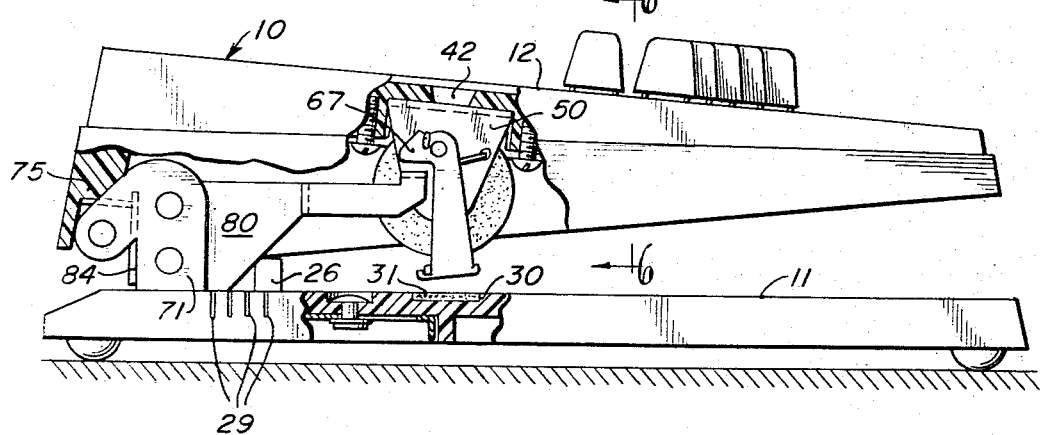
FIGURE 2 shows a side view of my check protector apparatus with a portion of the cover assembly broken away to show the marking and inking portions of my apparatus.

Referring to the drawings and more particularly to FIGURES 1 and 2, there is shown a check protector apparatus 10 which comprises a base assembly 11 and a cover assembly 12 which can be manually depressed as shown in FIGURE 5 to effect printing and/or embossing of selected numerals or characters on a check or instrument positioned on base assembly 11.

Base assembly 11 comprises base plate 20 having side and end walls integral therewith. Resilient footpads 24, located at the corners of plate 20, resiliently support the apparatus on a table, desk or the like.

A check positioning means composed of a slotted strip 25 having flanged stops 26 is flush against the bottom face of plate 20 and frictionally retained in a slidable position relative to plate 20 by means of rivets 27. Stops 26 are inserted in opposed slots 28 located near the edges of plate 20. Spaced indents 29 in plate 20 serve as indicators for the selective manual positioning of stops 26 whereby the desired portion or line of a check or instrument is properly positioned relative to the printing assembly of my device.

Located within recess 30 on the top face of plate 20 is a resilient pad 31, the purpose of which will be discussed hereafter.

Cover assembly 12 preferably comprises a flat molded cover having flanged end and side walls 40, with cover 40 having slots 41 and openings 42 therein. Cover 40 partially encloses a rack and pinion assembly 45 which includes a number of individual wheels 46, having various numerals or other characters 47 embossed on their peripheral rims 48. Each wheel is mounted on shaft 49 with the ends of the shaft being received in apertures, not shown, made in attaching bracket 50. The ends of shaft 49 are upset to prevent removal of the shaft from bracket 50. Each printing wheel has gear teeth 52 formed on the hub 53 so that the wheels function as pinions.

Individual rack assemblies 54 each comprise a rack member 55 having teeth 56, which are adapted for meshing with teeth 52, and an indexing arm 57 connected to one end of the rack member. The indexing arms 57 are positioned within slots 41 located in cover 40 after which the exposed ends of arms 57 are covered by handles 58 which are made of plastic or other suitable material. Handles 58 are biased from cover 40 by means of slotted springs 59 which fit over indexing arms 57. Movement of a handle 58 actuates an arm 57 which in turn causes rotation of a corresponding wheel 46. Numerical values or other characters are located along the lengths of each rack member 55, FIGURE 8, and these characters are readable through openings 42 in cover 40 as shown in FIGURE 1.

The fastening of bracket extensions 60, which are preferably integral with bracket 50, to the bottom face of cover 40 maintains bracket 50 and assembly 45 relative to cover assembly 12.

An ink pad 61 is secured by adhesion or other means to plate 62 having arms 63 which are spaced from attaching bracket 50 by means of stub shafts 64 having spacers 65 integral with the respective shafts. Butterfly spring 66 is positioned on one of the spacers, with one end of spring 66 fastened to an arm of bracket 50 while the remaining end of spring 66 is connected to arm 63. As shown in FIGURES 2 and 5, one of the arms 63 has a cam projection 67.

Bracket 70 having flanged hinge arms 71 is riveted at 72 to plate 20 adjacent stops 26. A second bracket 73 having flanged hinge arms 74 is screwed to cross rib 75 of cover 40. Rivets 76 or other suitable fastening means hinge the brackets 70, 73 together to permit a pivoting movement of one bracket relative to the other.

Fastened in a stationary position to arm 71 located on the same side of my apparatus as cam 67 is cam actuating finger 80 which has trip bar 81 that is adapted for engagement with cam 67 when my apparatus is in an operative position.

A cover assembly return spring 82 comprising a metal strip bent at a substantially right angle is riveted to connecting strip 83 of bracket 70. As shown in FIGURE 2, element 84 of spring 82 is perpendicular to plate 20 with the free end of element 84 abutting bracket 73. When the apparatus is in an operative position, bracket 73 causes displacement of resilient element 84 from its normal position to a sprung condition as illustrated in FIGURE 5.

Cover assembly 12, base assembly 11 and wheels 46 are preferably made of high impact styrene but could be made of other suitable plastic or metal materials. Base assembly 11 is preferably made of aluminum for lightness and to provide the necessary rigidity for proper imprinting. Although a particular number of wheels and characters have been illustrated, it is appreciated that the additional or fewer wheels having various symbols or characters embossed on their peripheral rims could be employed in my device without departing from the scope of my invention. Moreover, if desired, spacer wheels or other spacing means could be utilized to postion the printing wheels relative to each other.

Overall, the width of my check protector device is about 4⅜ inches whereas the length is approximately 7¼ inches. The maximum height, as measured from the surface of an object upon which apparatus 10 rests in an inoperative position as shown in FIGURE 2, is about 2½ inches with the overall weight of my unit being only about 17 ounces.

Operation

In operation, a check C is laid upon the upper face of base plate 20 and positoned to abut the selectively positioned stops 26. In this position, the portion of the check which is to be embossed and/or printed lies above resilient pad 31. Individual rack assemblies 54 are moved to their selected position as designated by the numerals or other characters which appear in openings 42. Placing of the operator's fingers on the top of cover 40 near cover end 34, FIGURE 5, causes assembly 12 to pivot about rivets 76. During this movement, stationary bar 81 contacts cam 67 which pivots spring biased plate 62 and ink pad 61, which normally is in contact with the numerals on wheels 46, to the position shown in FIGURE 5.

The inked characters embossed on the rims 48 of wheels 46 contact the portion of check C or other instrument resting on pad 31 and imprint the characters on the check. Release of the operator's fingers permits springs 66 and 82, both of which are biased from their normal position during the check imprinting operation, to return to their original positions thus effecting return of cover assembly 12 and ink pad 61 to their normal positions shown in FIGURE 2. The return movement of pad 61 on plate 62 is limited by stop arm 86, which extends outward from bracket 40 as seen in FIGURE 6. The operation can be readily repeated with relatively little skill required in order to become proficient in using my apparatus. The portable unit is compact and lightweight and readily adaptable for home use.

The above-described embodiment being exemplary only, it will be understood that the present invention contemplates the use of projections differing in detail from the presently described embodiment. Accordingly, the invention is not to be considered as limited save as is consonant with the scope of the following claims.

What is claimed is:

1. A check protector apparatus for imprinting characters on a check or the like, said apparatus comprising:
    a base assembly including a substantially flat base member having a recess and slots therein;
    end and sidewalls depending from the sides and ends of said base member;
    a resilient pad disposed within said recess;
    a check positioning means comprising a strip having flanged stops, said strip being slidably connected to said base member, said stops extending through said slots in said base member;
    a first bracket means fastened to one end of said base member;
    a cover assembly including a cover having a plurality of slots and a plurality of viewing apertures;
    end and sidewalls depending from the end and sides of said cover;
    a second bracket means attached to one end of said cover;
    means for pivotally connecting said first and second bracket means whereby said cover assembly is normally spaced from said base assembly;
    a third bracket means fastened to said cover;
    a shaft having its ends attached to said third bracket means;
    a plurality of wheels mounted for rotation on said shaft, each of said wheels having a plurality of characters embossed on the rim of said wheel and having a hub with gear teeth on said hub;
    a plurality of rack members, each of said rack members having teeth adapted for engagement with said teeth on a corresponding wheel, and characters, identical to the characters on a corresponding wheel, located on said rack member, said rack member positioned such that said characters located thereon are viewable through said apertures;
    a plurality of indexing arms, each of said arms having one end attached to a rack member while the remaining free end of said arm extends through a slot in said cover;
    handles enclosing said free end of said indexing arms, and spring means for biasing said handles from said covers;
    a plate having an ink pad thereon, said plate having flanged arms which are connected to said third bracket means, said plate normally positioned by a spring means for contact with said characters embossed on said wheels;
    a cam means projecting from one of said flanged arms;
    a cam actuating finger fixed to said base assembly for moving said plate and ink pad out of contact with said wheels when said apparatus is actuated.

2. An apparatus in accordance with claim 1 further including resilient footpads attached to the bottom of said base assembly.

3. An apparatus in accordance with claim 1 further including a stop means located on said third bracket for limiting the movement of said ink pad plate.

4. An apparatus in accordance with claim 3 further including a cover assembly return spring means attached to said base assembly and abutting this cover assembly for returning said cover assembly to its normal position following an imprinting operation.

5. A check protector apparatus for imprinting characters on a check or the like, said apparatus comprising:
    a base assembly including a substantially flat base member having a recess and slot therein;
    a resilient pad disposed within said recess;
    a check positioning means comprising a strip having a flanged stop, said strip being slidably connected to said base member, said stop extending through said slot in said base member;
    a first bracket means fastened to one end of said base member;
    a cover assembly including a cover having at least one slot and one viewing aperture;
    a second bracket means attached to one end of said cover;
    means for pivotally connecting said first and said second bracket means whereby said cover assembly is normally spaced from said base assembly;
a third bracket means fastened to said cover;
a shaft having its ends attached to said third bracket means;
at least one wheel located on said shaft and having at least one character on the rim of said wheel and having a hub with gear teeth thereon rigid with said wheel;
at least one selectively positioned rack member having teeth adapted for engagement with said teeth on said hub and character identical to said character on said wheel, located on said rack member, said rack member having an indexing arm located at one end which extends through said slot, said member being positioned such that said character located thereon is capable of being viewed through said aperture, said member and wheel means being the sole gear means in said apparatus;
a plate having an inking means thereon, said plate having flanged arms which are connected to said third bracket means, said plate normally positioned by a biasing means for contacting said character on said wheel; and
a cam actuating finger fixed to said base assembly for moving said plate and inking means out of contact with said wheel when said apparatus is actuated.

6. A check protector apparatus in accordance with claim 5 further including a stop means located on said third bracket means for limiting the movement of said plate.

7. A check protector apparatus in accordance with claim 5 further including handles enclosing said free end of said indexing arm and means for biasing said handles from said cover.

8. A check protector apparatus in accordance with claim 5 wherein said ink pad means is biased by a spring having one end attached to said third bracket means and the remaining end is connected to said ink pad means.

9. A check protector apparatus for imprinting characters on a check or the like, said apparatus comprising:
a base assembly including a substantially flat base member;
a first bracket means fastened to one end of said base member;
a cover assembly including a cover having at least one slot and one viewing aperture;
a second bracket means attached to one end of said cover;
means for pivotally connecting said first and said second bracket means;
biasing means located at said one end of said base member and contacting said cover and base assemblies whereby said cover assembly is normally spaced from said base assembly;
a third bracket means fastened to said cover and having two spaced arms depending from said third bracket means, each of said arms being spaced inwardly from the sides of said cover;
said third bracket means being located at a point spaced medially of the ends of said cover;
a shaft disposed between said arms of said third bracket, said shaft having two ends;
one of said shaft ends being attached to one of said bracket arms while said remaining shaft end is attached to said second bracket arm;
at least one wheel located on said shaft and having a plurality of characters on the rim of said wheel, and having a hub with gear teeth thereon rigid with said wheel whereby said shaft, wheel and hub are mounted within the sides and ends of said cover; and
at least one selectively positioned rack member having teeth adapted for engagement with said teeth on said hub and a plurality of characters, identical to said characters on said wheel, located on said rack member, said rack member being movably fastened to said cover assembly and positioned such that at least one of said characters located thereon is capable of being viewed through said aperture.

10. A check protector apparatus in accordance with claim 9, said apparatus further including:
a plate having an inking means thereon, said plate having flanged arms which are connected to said third bracket means, said plate normally positioned by a biasing means for contacting a character on said wheel; and
a cam actuating means fixed to said base assembly for moving said plate and inking means out of contact with said wheel when said apparatus is actuated by pressing on said cover assembly.

11. A check protector apparatus in accordance with claim 10 wherein said rack member and geared hub are the sole gear means in said apparatus.

References Cited

UNITED STATES PATENTS

| | | | |
|---|---|---|---|
| 1,329,606 | 2/1920 | Johanson | 101—20 |
| 1,331,934 | 2/1920 | May | 101—19 |
| 1,372,323 | 3/1921 | Tiefel | 101—20 |
| 1,397,118 | 11/1921 | Tiefel | 101—20 |
| 1,703,106 | 2/1929 | Hedman | 101—20 |
| 1,797,973 | 3/1931 | Bohrer | 101—20 |
| 1,943,607 | 1/1934 | Hedman | 101—20 |
| 2,794,387 | 6/1957 | Schultz | 101—20 |
| 3,105,436 | 10/1963 | Rounds et al. | 101—20 |

WILLIAM B. PENN, *Primary Examiner.*